United States Patent
Zhao et al.

(10) Patent No.: US 12,306,326 B2
(45) Date of Patent: May 20, 2025

(54) POSITIONING METHOD AND APPARATUS, AND STORAGE MEDIUM

(71) Applicant: Beijing Xiaomi Mobile Software Co., Ltd., Beijing (CN)

(72) Inventors: Kai Zhao, Beijing (CN); Guangjun Qiao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 481 days.

(21) Appl. No.: 17/702,373

(22) Filed: Mar. 23, 2022

(65) Prior Publication Data
US 2023/0122864 A1 Apr. 20, 2023

(30) Foreign Application Priority Data
Oct. 19, 2021 (CN) .......................... 202111216832.3

(51) Int. Cl.
*G01S 5/02* (2010.01)
*G01S 5/14* (2006.01)
*G01S 13/02* (2006.01)
*G01S 13/46* (2006.01)

(52) U.S. Cl.
CPC ............ *G01S 5/14* (2013.01); *G01S 5/02216* (2020.05); *G01S 13/0209* (2013.01); *G01S 13/46* (2013.01); *G01S 2013/466* (2013.01)

(58) Field of Classification Search
CPC .... G01S 5/14; G01S 5/02216; G01S 13/0209; G01S 13/46; G01S 2013/466; G01S 5/0081; G01S 5/06; G01S 5/0236; Y02D 30/70; H04L 5/0051; H04L 5/0094
See application file for complete search history.

(56) References Cited

U.S. PATENT DOCUMENTS

| | | | |
|---|---|---|---|
| 2008/0014960 A1* | 1/2008 | Chou | G01S 5/02216 455/456.1 |
| 2011/0007650 A1* | 1/2011 | Nam | G01S 5/14 370/252 |
| 2015/0304810 A1* | 10/2015 | Jalali | G06K 7/10009 370/336 |
| 2019/0306825 A1* | 10/2019 | Lindskog | H04W 24/10 |
| 2020/0245286 A1* | 7/2020 | Bilstad | H04W 56/0055 |
| 2021/0320769 A1 | 10/2021 | Cha et al. | |
| 2022/0236404 A1* | 7/2022 | Gunnarsson | G01S 13/878 |

FOREIGN PATENT DOCUMENTS

EP 3783986 A1 2/2021

* cited by examiner

*Primary Examiner* — Kenneth T Lam
(74) *Attorney, Agent, or Firm* — Volpe Koenig

(57) ABSTRACT

A positioning method includes acquiring configuration information from a ranging data frame structure. The configuration information includes a time offset. The time offsets of at least two different positioning devices differ from on another. The method includes determining a time domain position of a first time unit in the ranging data frame according to the time offset and sending a ranging message on the first time unit to a plurality of anchor devices within a preset range of the positioning device, the ranging message being used by a server to determine a position of the positioning device according to differences in times at which the ranging message is received by each of the plurality of anchor devices.

4 Claims, 8 Drawing Sheets

POSITIONING METHOD AND APPARATUS, AND STORAGE MEDIUM

CROSS REFERENCE TO RELATED APPLICATION

The present application is based upon and claims priority to Chinese Application No. 202111216832.3, filed on Oct. 19, 2021, the contents of which are incorporated herein by reference in its entirety.

BACKGROUND

Wireless positioning systems are relatively common positioning systems at present. Generally, a wireless positioning system includes a positioning device and an anchor device. The positioning device sends a ranging message to the anchor device. The anchor device can determine the distance between the positioning device and the anchor device based on the received ranging message. The distance can be used to determine a position of the positioning device.

SUMMARY

The disclosure relates to the technical field of communications, in particular to a positioning method and apparatus, and a storage medium.

According to a first aspect of the examples of the disclosure, a positioning method is provided. The positioning method can be implemented in a positioning device. The method includes acquiring configuration information from a ranging data frame structure. The configuration information includes a time offset. Each positioning device can have a unique time offset. For example, one positioning device has an offset that differs from the offset of another positioning device.

The method includes determining by a positioning device, based on the corresponding time offset, a time domain position of a first time unit. The first time unit is obtained from the ranging data frame. The method includes sending on the determined first time unit, a ranging message to a plurality of anchor devices within in a preset range of the positioning device. Each of the plurality of anchor devices respectively receives the ranging message at a corresponding respective time. The time at which a first one of the anchor devices receives the ranging message can differ from the time at which a second one of the anchor devices receives the ranging message, depending mainly on the distance between the positioning device and a corresponding one of the plurality of anchor devices. A server uses the ranging messages received by the anchor devices to determine a position of the positioning device. The determination is based at least in part on the differences in the times at which the each of the respective anchor devices received the corresponding ranging message from the positioning device.

According to a second aspect of the examples of the disclosure, a positioning method is provided. The positioning method can be implemented in an anchor device. The method includes determining by the anchor device, a respective time domain position of a corresponding first time unit for each of a plurality of respective, corresponding positioning devices The corresponding first time units are conveyed in a ranging data frame of a corresponding positioning device. Each corresponding positioning device is uniquely identifiable by its corresponding time offset. Each of the plurality of corresponding positioning devices has a time offset that differs from the time offset of the others.

The method includes receiving respective, corresponding ranging messages sent in the first time unit by each respective, corresponding one of the plurality of positioning devices. For each of the plurality of positioning devices, the anchor device determines a respective corresponding receiving time, i.e., the time at which a ranging message is received from the corresponding one of the plurality of positioning devices.

The method further includes sending to a server, by the anchor device, the ranging messages received by the anchor device from the plurality of positioning devices, including sending the respective corresponding receiving times for each of the ranging messages. The server uses the receiving times to determine positions of each of the corresponding positioning devices. The server makes the determination based on differences in the respective corresponding receiving times. Differences in the receiving times correspond to differences in distances. The distance between each of the positioning devices and the anchor device can be determined based on the differences in the corresponding receiving times. The server then uses differences in the distances to determine positions of each of the respective, corresponding positioning devices.

According to a third aspect of the examples of the disclosure, a positioning method is provided. The positioning method can be implemented in a server. The method includes receiving by the server, from a plurality of anchor devices, a plurality of ranging messages received by the anchor devices from corresponding positioning devices. This includes receiving corresponding, respective times at which each of the plurality of anchor devices received the ranging messages from each of the positioning devices.

The method includes performing, by the server, time synchronization of the corresponding, respective receiving times received from the plurality of anchor devices. The server performs the time synchronization according to system synchronization information. The server provides a synchronized receiving time for each receiving time. The method further includes determining, by the server, differences in the synchronized receiving times.

Based on the differences in the synchronized receiving times, the server determines differences in distances between each of the positioning devices and each of the plurality of corresponding anchor devices. The method further includes determining, by the server, a position of a positioning device based on differences in the distance from the positioning device to each of the plurality of anchor devices, and further based on positions of each of the plurality of anchor devices as determined by the server.

According to a fourth aspect of the examples of the disclosure, a positioning apparatus is provided. The positioning apparatus includes a processor and a memory storing processor-executable instructions. The processor is configured to execute the processor executable instructions. When the processor executes the processor-executable instructions stored in the memory, the processor is configured to perform the steps in the positioning method according to the first aspect, the second aspect or the third aspect of the examples of the disclosure.

According to a fifth aspect of the examples of the disclosure, a non-transitory computer-readable storage medium is provided. When processor-executable instructions in the storage medium are executed by a processor of a positioning apparatus, the positioning apparatus is configured to execute the steps of the positioning method according to the first aspect, the second aspect or the third aspect of the examples of the disclosure.

It should be understood that the above general description and the following detailed description are only exemplary and explanatory, and are not intended to limit the disclosure.

BRIEF DESCRIPTION OF DRAWINGS

The accompanying drawings herein are incorporated into the specification and constitute a part of the specification. They show examples consistent with the disclosure, and are used to explain the principle of the disclosure together with the specification.

DETAILED DESCRIPTION OF THE EXAMPLES

Examples will be described in detail herein and illustrated in the accompanying drawings. When the following descriptions refer to the drawings, the same numbers in different drawing figures indicate the same or similar elements, unless otherwise indicated. The implementation manners described in the following examples do not represent all possible implementation manners consistent with the disclosure. Instead, they are merely examples of apparatuses consistent with some aspects of the disclosure described as detailed in the appended claims.

A typical positioning process usually involves bi-directional communication between a positioning device and an anchor device to transmit and receive messages therebetween. One-way positioning generally requires sending messages from the positioning device to at least three anchor devices. Sending multiple messages results in frequent wireless communications, low positioning efficiency, and time delays.

Positioning a plurality of positioning devices only compounds these problems and introduces problems of mutual interference and collision of signals due to the number of positioning devices involved and the number of ranging messages that could potentially be sent at the same time during the positioning process.

In related technologies, in order to improve the accuracy of positioning, a bilateral ranging approach is usually taken. In one-round positioning process, a positioning device sends a ranging message to an anchor device. The anchor device returns an acknowledge message to the positioning device in response. Both the positioning device and the anchor device need to accurately record sending and receiving times of these messages. Timestamps are generally used for this purpose.

The timestamps in the messages sent between the positioning device and the anchor device are acquired and used to determine absolute transmission times. An absolute transmission time is the time between the sending of the message by the positioning device and the receiving of the message by a corresponding anchor device. Distance between the positioning device and the anchor device is estimated according to the absolute transmission time.

In order to determine position of a single positioning device using the above method, the positioning device needs to exchange messages with at least three anchor devices. These exchanges significantly increase the number of message interactions between the positioning device and the anchor device during the positioning process for one positioning device. These message exchanges incur communication delays and consume resources. The scalability of a positioning system will be reduced accordingly. As well, the number of positioning devices that the positioning system can position per unit time (for example, 1 second) is greatly reduced.

Figure 1:
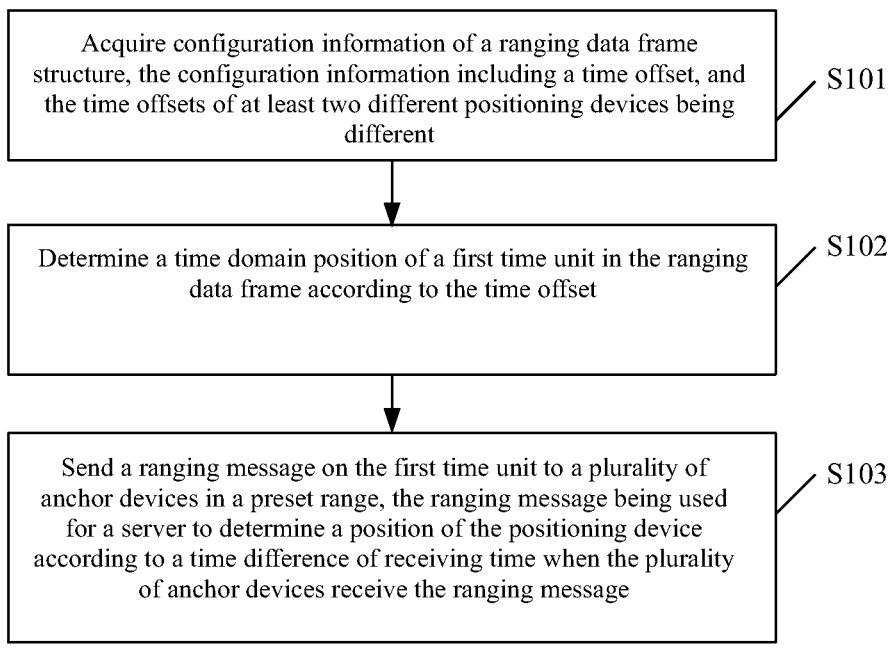
FIG. 1 is a first flowchart of a positioning method according to an example.

An example of the disclosure provides a positioning method that addresses these problems. FIG. 1 is a first flowchart of a positioning method according to an example. As shown in FIG. 1, the method is performed by a positioning device. The method includes Step S101, in which the positioning device acquires configuration information from a ranging data frame structure. The configuration information includes a time offset. The time offsets of at least two different positioning devices are different from one another. In Step S102, a time domain position of a first time unit obtained from the ranging data frame is determined according to the time offset. In Step S103, the positioning device sends a ranging message on the first time unit to a plurality of anchor devices within a preset range of the positioning device. The ranging message is used by a server to determine a position of the positioning device. For example, a first anchor device receives the ranging message at a first time. A second anchor device receives the ranging message at a second time. The server uses the difference between the first time and the second time to determine a position of the positioning device.

In the example of the disclosure, the positioning device is a terminal device whose position in a positioning system is to be determined. The positioning system includes a positioning device, an anchor device and a server. The positioning device may be a terminal device with a wireless communication function. The terminal device may include a mobile terminal and a fixed terminal. The mobile terminal may include any of a smart phone, a tablet computer and a wearable device. The fixed terminal may include any of a desktop computer, an all-in-one computer and a smart home device. The wireless communication protocol may be Bluetooth, Ultra Wide Band (UWB) or any other radio frequency (RF) communication technique.

In step S101, the positioning device acquires the configuration information from the ranging data frame structure in advance of making a positioning determination. The positioning device determines a time offset of the positioning device based on the configuration information. The positioning device may acquire the configuration information from the ranging data frame structure received from the server. The positioning device communicates wirelessly according to the configuration information it obtains from the ranging data frame structure.

It should be noted that the configuration information carried by the ranging data frame structure may be automatically generated by the server and sent from the server to the positioning device and the anchor device. It can be understood that the server can generate the configuration information for the ranging data frame structure in a configuration stage of the positioning system, and can send the configuration information to each positioning device and anchor device in the positioning system to facilitate the positioning of the positioning device and to facilitate the anchor device in its determinations of time offsets and first time units.

The term frame structure refers to a data structure in which a frame is composed of several parts. Each part is configured to perform a different function. In an example of the disclosure, the frame structure includes a first time unit part. The first time unit part is used for positioning and/or ranging. The time unit of the first time unit part may apply to subframes, time slots, symbols or other aspects of data to be transmitted.

The positioning device may send on the first time unit, an extremely narrow pulse, e.g., a pulse having a time duration of nanoseconds or microseconds or less. The positioning device may receive from each of a plurality of anchor devices, a corresponding indication of a receiving time, i.e., a time at which each anchor device received the narrow pulses. The positioning device determines differences in these times during the time when the plurality of anchor devices detect signal pulses. The positioning device determines differences in the distance between the positioning device and each of the plurality of anchor devices based on the differences in the receiving times of the narrow pulses and the speed of signal transmission in the air (generally considered to be the speed of light).

It should be noted that the first time unit may be dedicated to positioning and/or ranging, and will not necessarily be used to perform other functions. Or the first time unit may also be used to perform other functions. When the positioning device is not performing positioning and/or ranging functions, the positioning device may use time-frequency resources on the first time unit to perform other functions. When the positioning device is performing positioning and/or ranging functions, the positioning device uses the time-frequency resources on the first time unit. The positioning device may give priority to performing positioning and/or ranging functions.

The configuration information conveyed by a ranging data structure includes at least a time offset. The time offset indicates a time offset of a time domain start position of the first time unit relative to a time domain start position of the ranging frame data structure. In an example of the disclosure, the value of the time offset may be randomly generated by the server. It can be understood that the time offsets of at least two different positioning devices differ from one other. In other examples, the value of the time offset may be any value in a set of random numbers pre-generated by the server according to the number of positioning devices in the positioning system. It can be understood that different positioning devices correspond to different time offsets. In step S102, because the time offset is used to indicate the time offset of the time domain start position of the first time unit relative to the time domain start position of the frame structure, the positioning device may determine the time domain position of the first time unit in the frame structure based on the time offset.

In an example of the disclosure, if the time offsets of at least two different positioning devices in the positioning system differ from one another, the time domain positions of the first time units in the corresponding frame structure also differ from one another, because the time domain positions are determined by the positioning devices on the basis of the time offsets. Accordingly, the time-frequency resources of the first time unit of one positioning device differs from the time-frequency resources of the first time unit of another positioning device. These differences reduce the chances of ranging signal conflicts between the positioning devices.

In other examples, if the time offsets of different positioning devices in the positioning system differ from one another, the time domain positions of the first time unit in the frame structure also differ from one another, because these are determined by the different positioning devices on the basis of the time offsets. Accordingly, the first time unit of each positioning devices in the positioning system is unique. This reduces ranging signal conflicts between the positioning devices. In step S103, the preset range may be defined by a circle with the positioning device at the center and a preset distance being the radius. The preset distance corresponds to a maximum communication distance of the positioning device.

After determining the time domain position of the first time unit, the positioning device sends the ranging message on the first time unit, so that a plurality of anchor devices in the preset range receive the ranging message. The positioning device may broadcast the ranging message on the first time unit, so that the plurality of anchor devices in the preset range can receive the broadcast ranging message. In this way, the positioning device sends the ranging message to the plurality of anchor devices in the preset range by one-time broadcasting, improving the positioning efficiency.

In some examples, the ranging message carries a device identity of the positioning device. The positioning device broadcasts the ranging message carrying the device identity of the positioning device on the first time unit. After the plurality of anchor devices in the preset range receive the broadcast ranging message, the positioning device corresponding to the ranging message can be determined according to the device identity in the ranging message.

In an example of the disclosure, the positioning device broadcasts the ranging message on the first time unit, and after receiving the ranging message, each of the plurality of anchor devices within the preset range records its receiving time, i.e., the time at which the anchor device receives the ranging message. The anchor devices send the ranging messages and the receiving times of the ranging messages to the server.

The server determines, according to the ranging messages and the receiving times of the ranging messages, differences in the receiving times for each of the plurality of anchor devices with respect to a given positioning device. The server also determines, according to the receiving time differences, differences in the distances between the given positioning device and each of the plurality of corresponding anchor devices. The server also determines the position of the positioning device according to the position of each anchor device and the distance differences.

It should be noted that the clocks of different anchor devices in the positioning system may be asynchronous. After the server receives the ranging messages sent by the plurality of anchor devices and the receiving times of the ranging messages, the receiving times of the ranging messages received by the plurality of anchor devices are synchronized on the basis of synchronization information of the system. This reduces chances of inaccurate positioning caused by the differences in time synchronization between the anchor devices.

Considering the problems of network delay and excessive network resource consumption caused by many message interactions between the anchor devices and the positioning device during single device positioning, the disclosed positioning method based on bilateral ranging has advantages. When the positioning device is positioned in the examples of the disclosure, the server performs the positioning based on differences in the receiving times recorded by the plurality of anchor devices, instead of the absolute time when the ranging message is transmitted between the positioning device and the anchor devices.

In the one-time positioning process, the positioning device need only send a ranging message to the anchor devices, and need not receive response messages from the anchor devices. This reduces the message interactions between the anchor devices and the positioning device, and saves communication resources and communication time, so that the number of positioning devices that can be accommodated by the positioning system is significantly increased without increasing the amount of communication resources consumed.

In an example of the disclosure, by configuring different time offsets for at least two different positioning devices, the time domain positions of the first time units of the at least two different positioning devices differ from one another and the times at which the at least two different positioning devices send ranging messages differs correspondingly. Therefore, the anchor devices receive the ranging messages of different positioning devices on different first time units according to the different time offsets, which reduces mutual interference and collision between signals.

In some examples, the first time unit occurs in the frame structure according to a predetermined cycle, and the predetermined cycle is determined by the type of the positioning device. In the example of the disclosure, the predetermined cycle may be preset, and the predetermined cycles for different types of positioning devices may differ from one another. Different predetermined cycles may be configured for the positioning device according to different application scenarios in which the positioning method is deployed. The positioning device may periodically send the ranging message on the basis of the predetermined cycle of the first time unit. In some examples, the ranging message carries time at which the positioning device sends the ranging message.

The positioning device periodically sends ranging messages, and the plurality of anchor devices receive the plurality of ranging messages sent by the positioning device. The anchor devices record the receiving time of each received ranging message. The anchor devices send the ranging messages and the receiving times of the ranging messages to the server.

The server determines which of the plurality of ranging messages are from the same positioning device based on the device identities in the ranging messages, and the times at which ranging messages sent by the same positioning device are received by each of the plurality of anchor devices. The server also determines differences in times at which of each of the plurality of anchor devices receives a ranging message corresponding to the same sending time, based on the sending time carried by each of the plurality of ranging messages. The server determines a position of the positioning device corresponding to the sending time, and also determines a motion trajectory of the positioning device according to the positions of the positioning device corresponding to multiple periods including different sending times.

In an example of the disclosure, the positioning device periodically sends ranging messages. When the positioning device needs to be positioned, the plurality of anchor devices in the preset range can receive the ranging messages of the positioning device at any time, and the positioning device or anchor devices do not need to send ranging request messages.

Each positioning device periodically sends ranging messages, and the plurality of anchor devices receive the ranging messages, which are sent by each positioning device at a sending time that differs from that of other position devices. Each of the plurality of anchor devices records the time at which each ranging message is received. Differences in the receiving times correspond to the differences sending times from one positioning device to another, so that the server can determine the positions of each of the positioning devices based on differences in sending times and based the time at which each of the plurality of anchor devices receives the corresponding ranging messages. This allows the server to analyze the motion trajectory of a positioning device.

In some examples, types of positioning devices include mobile devices and fixed devices. The predetermined positioning cycle corresponding to the mobile device type is less than that corresponding to the fixed device type. Mobile positioning devices and fixed positioning devices change position in different ways. Accordingly, in examples of the disclosure, the frequency of positioning a mobile positioning device differs from the frequency of positioning a fixed positioning device.

For sake of positioning accuracy and to conserve wireless network resources, a shorter predetermined positioning cycle can be configured for the mobile positioning device. A mobile positioning device has more frequent and larger position changes. A longer predetermined positioning cycle can be configured for the fixed positioning device. A fixed positioning devices changes position less frequently and with smaller position changes. Thus, different types of positioning devices can be tracked and positioned at different rates.

In some examples a positioning system includes a mobile robot carrying a mobile positioning device and a static asset configured with a fixed positioning device. In that example, the predetermined cycle of the first time unit in which the mobile positioning device sends ranging messages can be set to 0.2 second. That way, a motion trajectory of the mobile robot can be determined once per second according to the plurality of ranging messages of the mobile positioning device. The predetermined cycle of the first time unit in which the fixed positioning device sends ranging messages can be set to 3 seconds. That way, a position of the static asset can be determined once per 3 seconds according to the ranging messages of the fixed positioning device.

In some examples, after step S103, the method further includes switching the working mode to a first mode in the first time unit of the frame structure and switching the working mode to a second mode beyond the first time unit of the frame structure, such that the power consumption in the second mode is lower than the power consumption in the first mode. In the example of the disclosure, the positioning device includes at least two working modes: a first mode and a second mode, wherein the power consumption when the positioning device is in the second mode is lower than it is when the positioning device is in the first mode.

The second mode may be a sleep mode in which the positioning device is in a sleep state. In that case the functional chip and other structures of the positioning device are in a low power consumption state. The first mode may be an active mode, in which the positioning device can send ranging messages. In that case, the functional chip and other structures of the positioning device are in a normal operation state.

In the first time unit of the frame structure, the positioning device may switch to the first mode, and send ranging messages on the first time unit. Beyond the first time unit of the frame structure, the positioning device may switch to the second mode to reduce the power consumption of the positioning device.

In this way, the positioning device can switch to the first mode in the first time unit to send the ranging message when needed, and can switch to the second mode with lower power consumption beyond the first time unit, and can also switch back to the first mode when the first time unit of a next cycle occurs. This can reduce the power consumption and improve the endurance of the positioning device. Not only that, this technique improves resource utilization and increases the number of positioning devices that the positioning system can accommodate.

In some examples, the first time unit occurs in the frame structure according to a predetermined cycle. The predetermined cycle may be determined by the type of the positioning device. In some examples, the types of the positioning devices are a mobile device and a fixed device. The predetermined cycle corresponding to the mobile device type is less than that corresponding to the fixed device type.

In some examples, the method further includes switching the working mode to a first mode in the first time unit of the frame structure, and switching the working mode to a second mode beyond the first time unit of the frame structure, the power consumption of the second mode being lower than that of the first mode.

Figure 2:
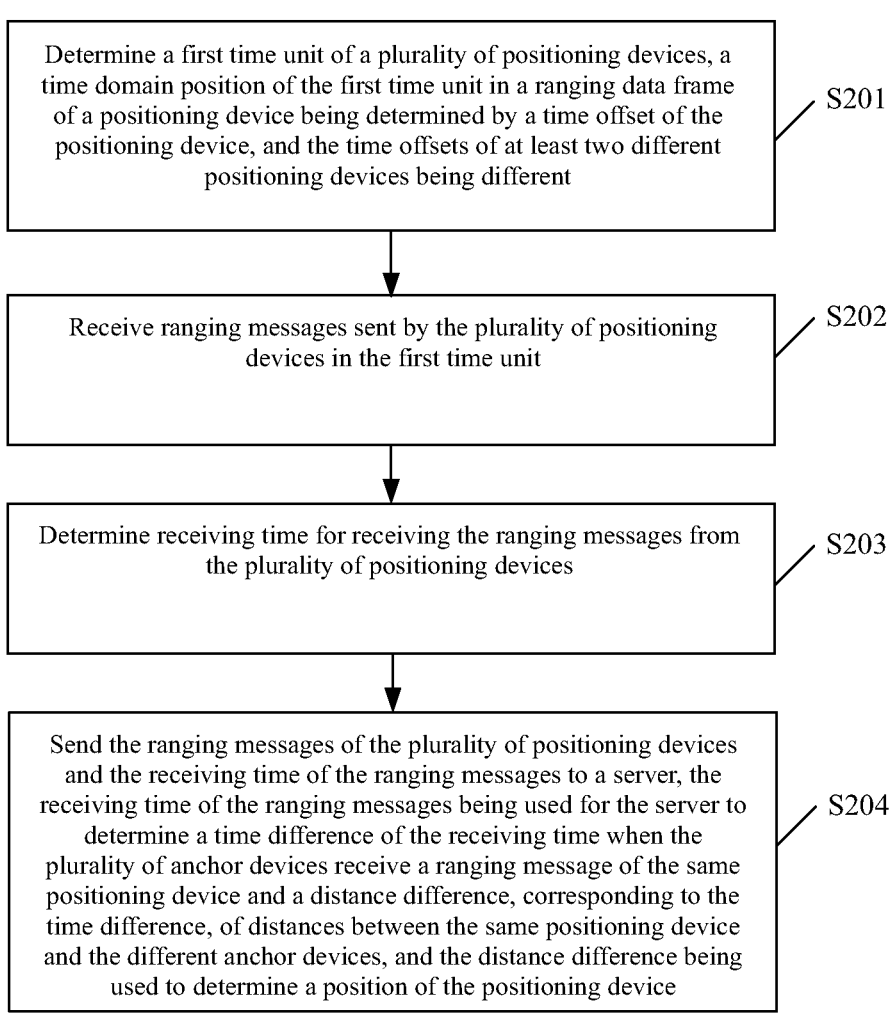
FIG. 2 is a second flowchart of a positioning method according to an example.

An example of the disclosure provides a positioning method. FIG. 2 is a second flowchart of a positioning method according to an example. As shown in FIG. 2, the method is implemented in an anchor device. The method includes Step S201, in which a first time unit for each of a plurality of positioning devices is determined. A time domain position of the first time unit in a ranging data frame of each of the plurality of positioning devices is determined by a time offset of each the plurality of positioning devices. The time offsets of at least two different positioning devices differ from one another. In Step S202, ranging messages sent by the plurality of positioning devices are received in the first time unit by the anchor device. In Step S203, receiving times for receiving the ranging messages from each of the plurality of positioning devices are recorded. In Step S204, the ranging messages of the plurality of positioning devices and the recorded receiving times of the ranging messages are sent to a server. The receiving times of the ranging messages are used by the server to determine differences in the receiving times. Differences in the time at which each of the plurality of anchor devices receives a ranging message from the same positioning device correspond to differences in distance between the positioning device and each of the anchor devices. The distance differences are used to determine a position of the positioning device.

In an example of the disclosure, the anchor device is any device that establishes wireless communication with the positioning device in a positioning scenario. The position of the anchor device in the positioning scenario is usually fixed. The anchor device can be powered by a battery or can be powered by solar energy, or the anchor device can also be powered by an external power source.

In step S201, the anchor device may acquire configuration information from ranging data frame structures sent by a plurality of positioning devices that are within a preset range of the anchor device. The anchor device determines a first time unit for each of the plurality of positioning devices according to time offsets given in the configuration information.

The ranging data frame structure of the plurality of positioning devices includes a first time unit part. The first time unit part is used for positioning and/or ranging. The time unit of the first time unit part applies to but is not limited in application to: subframes, time slots or symbols. The time offset is used to indicate an offset of a time domain start position of the first time unit relative to a time domain start position of the frame structure. In the example of the disclosure, the value of the time offset may be randomly generated by the server. It can be understood that the time offsets of at least two different positioning devices differ from one another. In other examples, the value of the time offset may be any value in a set of random numbers pre-generated by the server according to the number of positioning devices in the positioning system. It can be understood that the time offsets of different positioning devices differ from one another.

Each of the positioning devices sends a corresponding ranging message in the first time unit. Accordingly, the anchor device determines the first time unit for each of the plurality of positioning devices in the preset range so as to receive the ranging message from each of the plurality of positioning devices in the first time unit. In an example of the disclosure, the preset range may be given by a circle with the anchor device at the center. In that case the preset distance is the radius of the circle. The preset distance may correspond to a maximum communication distance of the anchor device.

In step S202, the anchor devices detect and receive the ranging messages sent by each of the plurality of positioning devices in the first time unit. In other examples, the anchor devices may also receive ranging messages sent by each of the plurality of positioning devices by blind detection, i.e. detecting the messages without prior knowledge of the signal characteristics or channel information.

In an example of the disclosure, the anchor devices may acquire configuration information for performing blind detection. The configuration information for blind detection may include frequency range information and time domain range information for the blind detection. The anchor devices perform blind detection on the ranging messages of the plurality of positioning devices on the basis of the frequency range information and the time domain range information.

The ranging messages carry device identities of the positioning devices. The anchor devices may distinguish the positioning devices from one another according to the device identities in the received ranging messages, without determining the first time unit of the plurality of positioning devices.

In step S203, when receiving the ranging messages sent by the positioning devices, the anchor devices record the receiving times, i.e., the time at which each of the ranging messages is received by a corresponding anchor device. The anchor devices may generate receiving timestamp information when receiving the ranging messages from the positioning devices. Timestamps provide complete and verifiable data indicating that a piece of data, usually a character sequence, has existed since a certain time. The timestamp information can uniquely identify a particular moment in time.

In step S204, the anchor devices may package the received ranging messages and the receiving times of the ranging messages into ranging data packets, and send the ranging data packets to the server, so that the server can estimate positions of the positioning devices according to the ranging data packets. Each ranging data packet includes at least a ranging message, receiving timestamp information of the ranging message, and a device identity of the anchor device.

The ranging message carries a device identity of the positioning device. The device identity of the positioning device is used by the server to determine which of the plurality of positioning devices sent a ranging message. Ranging data packets that include messages received from the same positioning device can be determined from among a plurality of ranging data packets. The server uses the device identity of the anchor device to determine the particular anchor device that sent a ranging data packet so as to obtain the position of the anchor device to position the positioning device.

The anchor device may generate a ranging data packet after receiving the ranging message, and may send the ranging data packet to the server. It can be understood that each time the anchor device receives a ranging message, it communicates with the server once to send a corresponding ranging data packet. The server may determine which of a plurality of ranging data packets are from the same positioning device based on the device identity of the positioning device. The device identity is received in the ranging data packets sent to the server by the plurality of anchor devices.

For each of a plurality of anchor devices, the server uses timestamp information in the ranging messages included in the ranging data packets, to determine a receiving time, i.e., a time at which each anchor device received a ranging message from a corresponding positioning device. The server determines differences in these receiving times. Based on these time differences, the server estimates distances differences, i.e., differences in distance between a positioning device and each of the plurality of corresponding anchor devices. The server determines positions of each of the anchor devices according to the device identities in the ranging data packets. The server determines a position of the positioning device based on the positions of each of the plurality of anchor devices and the differences in distance between the positioning device and each of the plurality of anchor devices.

In other examples, the ranging message further includes timestamp information indicating the time at which the positioning device sends the ranging message. After each anchor device receives the ranging message, the anchor device generates a corresponding ranging data packet. The server sends a plurality of ranging data packets generated within a preset time period to the server once in every preset time period.

The server uses the sending timestamp information as a basis for determining which of the ranging data packets correspond to the sending time, so as to determine the position of the positioning device at that sending time. The server may determine which of a plurality of ranging data packets correspond to the same positioning device based on the device identity of the positioning device. The identity of each positioning device is provided in the corresponding ranging data packet sent to the server by each of the plurality of anchor devices. The server determines which of a plurality of ranging data packets have the same sending time according to the sending timestamp information that the positioning device sends in the ranging message and which the anchor devices send to the server in the ranging data packets.

On the basis of the receiving timestamp information of the ranging messages in the plurality of ranging data packets indicating the same sending time, the server determines difference in receiving times, i.e., differences it a time at which each of the plurality of anchor devices received the ranging message. The server estimates differences in distances between the positioning device and each of the plurality of anchor devices based on the time differences. The server determines positions of the anchor devices based on the device identities of the anchor devices provided in the ranging data packets. The server determines a corresponding position of the positioning device at the sending time according to the positions of each of the plurality of anchor devices and the distance differences.

In embodiments of the disclosure, the server estimates a distance difference between the positioning device and each of the anchor devices, as well as position of the positioning device, based on the differences in time at which the ranging message sent by the positioning device arrives at each of the anchor devices. That ensures accurate determination of the time difference, which is the key to accurate positioning.

Considering that the clocks of different anchor devices may be asynchronous, in order to ensure the accuracy of the time difference, after the server receives the ranging messages from each of the plurality of anchor devices and records the receiving time of each of the ranging messages, the recorded receiving time of each of the ranging messages received by each of the plurality of anchor devices needs to be synchronized on the basis of synchronization information of the system. This synchronization reduces chances of inaccurate positioning dues to issues with the time synchronization of the anchor devices.

In an example of the disclosure, the anchor devices obtain receiving time for receiving ranging messages by receiving the ranging messages sent by the plurality of positioning devices in the positioning system, and send the ranging messages and the receiving time of the ranging messages to the server, so that the server can estimate, according to the time difference of receiving time when the plurality of anchor devices receive the ranging message sent by the same positioning device, a distance difference between distances from the same positioning device to the plurality of anchor devices (i.e., estimates a relative positional relationship between the same positioning device and the plurality of anchor devices), so as to determine a position of the positioning device according to the positions of the plurality of anchor devices and the distance difference, which realizes the tracking and positioning of the positioning device.

In some examples, the anchor devices include first anchor devices and a second anchor device. The first anchor devices may generate a plurality of first ranging data packets on the basis of the ranging messages received from a plurality of positioning devices. The first anchor devices send the generated first ranging data packets to the second anchor device.

The second anchor device may generate a plurality of second ranging data packets on the basis of the ranging messages received from the plurality of positioning devices, and may send the generated second ranging data packets and the received first ranging data packets to the server.

In an example of the disclosure, the second anchor device may be a master anchor device and the first anchor devices may be slave anchor devices. The slave anchor devices communicate with a plurality of positioning devices to complete a ranging process. The master anchor device can communicate with the plurality of positioning devices to perform the ranging process and collect ranging data packets from each of a plurality of slave anchor devices. The master anchor device can send the ranging data packets to the server, so that the server can track and position the positioning device according to the ranging data packets.

In some examples, the method further includes acquiring system synchronization information sent by the server. System time synchronization is performed on clocks of the anchor devices on the basis of the system synchronization information. In an example of the disclosure, the server sends the system synchronization information to the plurality of anchor devices in the positioning system. After each of the plurality of anchor devices receives the system synchronization information, time synchronization is performed on local clock sources of the anchor devices on the basis of the system synchronization information.

For accuracy of positioning, examples of the disclosure ensure that the clock of each anchor device is accurately synchronized with the system clock of the server. Each anchor device has its own independent local clock source. The crystal oscillators of each of the anchor devices can differ from one another due to factors such as variations manufacturing process, environment, operating environment and temperature. The clocks of different anchor devices may be offset from one another, and the clocks may be asynchronous. In an example of the disclosure, the anchor device acquires the system synchronization information of the server, and completes the clock synchronization on the basis of the system synchronization information.

In some examples, the method further includes the following. The second anchor device acquires the system synchronization information sent by the server, and system time synchronization is performed on the clock of the second anchor device on the basis of the system synchronization information. After the time synchronization is completed, the system synchronization information is forwarded to the plurality of first anchor devices. In some examples, the method further includes acquiring system synchronization information sent by the server and performing system time synchronization on clocks of the anchor devices on the basis of the system synchronization information.

Figure 3:
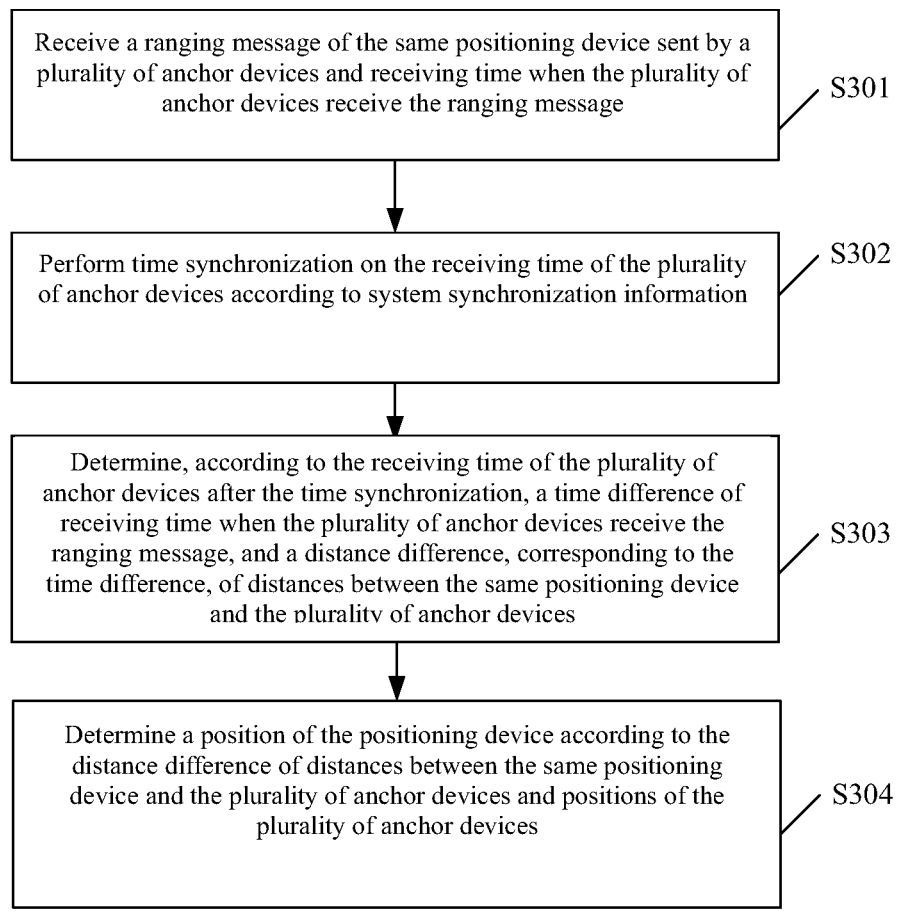
FIG. 3 is a third flowchart of a positioning method according to an example.

An example of the disclosure provides a positioning method. FIG. 3 is a third flowchart of a positioning method according to an example. As shown in FIG. 3, the method is applied to a server, includes Step S301, in which a ranging message of the same positioning device sent by a plurality of anchor devices and receiving time when the plurality of anchor devices receives the ranging message are received. In Step S302 time synchronization is performed on the receiving time of the plurality of anchor devices according to system synchronization information.

In Step S303, according to the receiving time of the plurality of anchor devices after the time synchronization, a time difference of receiving time when the plurality of anchor devices receive the ranging message, and a distance difference, corresponding to the time difference, of distances between the same positioning device and the plurality of anchor devices are determined. In Step S304, a position of the positioning device is determined according to the distance difference of distances between the same positioning device and the plurality of anchor devices and positions of the plurality of anchor devices.

In step S301, the server receives a plurality of ranging data packets sent by the plurality of anchor devices. Each ranging data packet includes at least a ranging message, receiving timestamp information of the ranging message, and a device identity of the anchor device. The ranging data packet is generated by the anchor device on the basis of the received ranging message. The ranging message carries a device identity of the positioning device.

The server determines which of the ranging data packets correspond to the same positioning device based on the device identity of the positioning device in the plurality of ranging data packets. In some examples, the ranging message further includes sending timestamp information, i.e., time that the positioning device sent the ranging message.

The plurality of ranging data packets received by the server may be a plurality of ranging data packets generated by the anchor devices in a preset time period. On the basis of the sending timestamp information and the device identity of the positioning device, the ranging data packet corresponding to ranging messages sent by the same positioning device at the same sending time can be determined. On that basis the server can determine a position of the positioning device at the sending time according to the ranging data packet.

It should be noted that, in order to save network resources and reduce interactions between the server and the anchor device, the anchor device generates a ranging data packet after receiving the ranging message, and sends a plurality of ranging data packets generated in the preset time period to the server once every preset time period.

In step S302, after determining which of the ranging data packets sent by each of the plurality of anchor devices correspond to the same positioning device, the server synchronizes receiving timestamp information in the ranging data packets to the same time domain on the basis of the system synchronization information, to perform time synchronization of the times at which each of the plurality of anchor devices received the ranging message from the same positioning device.

It should be noted that the server estimates the distance difference between the positioning device and each anchor device and the position of the positioning device, based on the difference in the times at which that the ranging message sent by the positioning device arrives at each of the plurality of anchor device. Accurate determination of the time difference is key to ensuring accurate positioning. Considering that the clocks of different anchor devices may be asynchronous, in order to ensure the accuracy of the time difference, the server needs to perform time synchronization on the receiving time, i.e., the times at which each of the plurality of anchor devices receives the ranging message. This reduces inaccurate positioning caused by the asynchronous time of the anchor devices.

In step S303, the server determines, according to the synchronized receiving time of the plurality of anchor devices, the time difference of the receiving time when the plurality of anchor devices receive the ranging message of the same positioning device; and estimates, according to the time difference, the distance difference of distances between the same positioning device and the plurality of anchor devices.

In an example of the disclosure, differences in the distance between a positioning device and each of the plurality of corresponding anchor devices may be used to describe the relative positional relationship between the positioning device and each of the plurality of anchor devices. In step S304, after determining the difference in the distances as described above, the server determines the positions of each of the anchor devices based on the device identities of the anchor devices in the ranging data packets. The server determines the position of the positioning device based on the positions of each of the plurality of anchor devices and the distance differences.

The position of the positioning device may be determined according to the positions of the plurality of anchor devices and the distance difference on the basis of a hyperbolic positioning method. It should be noted that a hyperbola can be determined on the basis of the distance difference between the positioning device and any two anchor devices based on any two anchor devices in the plurality of anchor devices as focuses. A plurality of hyperbolas is determined according to the plurality of anchor devices. The position of the positioning device is determined according to the plurality of hyperbolas. The absolute value of the difference between the distances from any point on the hyperbola to the two focuses on the plane is constant.

In some examples, the method further includes:

The system synchronization information is sent to the plurality of anchor devices, the system synchronization information being used for the anchor devices to perform system time synchronization according to the system synchronization information.

In the example of the disclosure, the server sends the system synchronization information to the plurality of anchor devices in the positioning system, and after the plurality of anchor devices receive the system synchronization information, time synchronization is performed on local clock sources of the anchor devices on the basis of the system synchronization information.

It should be noted that, for the accuracy of positioning, the example of the disclosure requires that the clock of each anchor device is accurately synchronized with the system clock of the server. Because each anchor device has its own independent local clock source, and the crystal oscillator of the anchor device is different in factors such as manufacturing process, environment, operating environment and temperature, the clocks of different anchor devices may be offset, and the clocks may be asynchronous. On this basis, the server sends the system synchronization information to the plurality of anchor devices in the positioning system, so that the plurality of anchor devices complete clock synchronization on the basis of the system synchronization information.

In some examples, the method further includes sending the system synchronization information to the plurality of anchor devices. The system synchronization information is used for the anchor devices to perform system time synchronization according to the system synchronization information.

Figure 4:
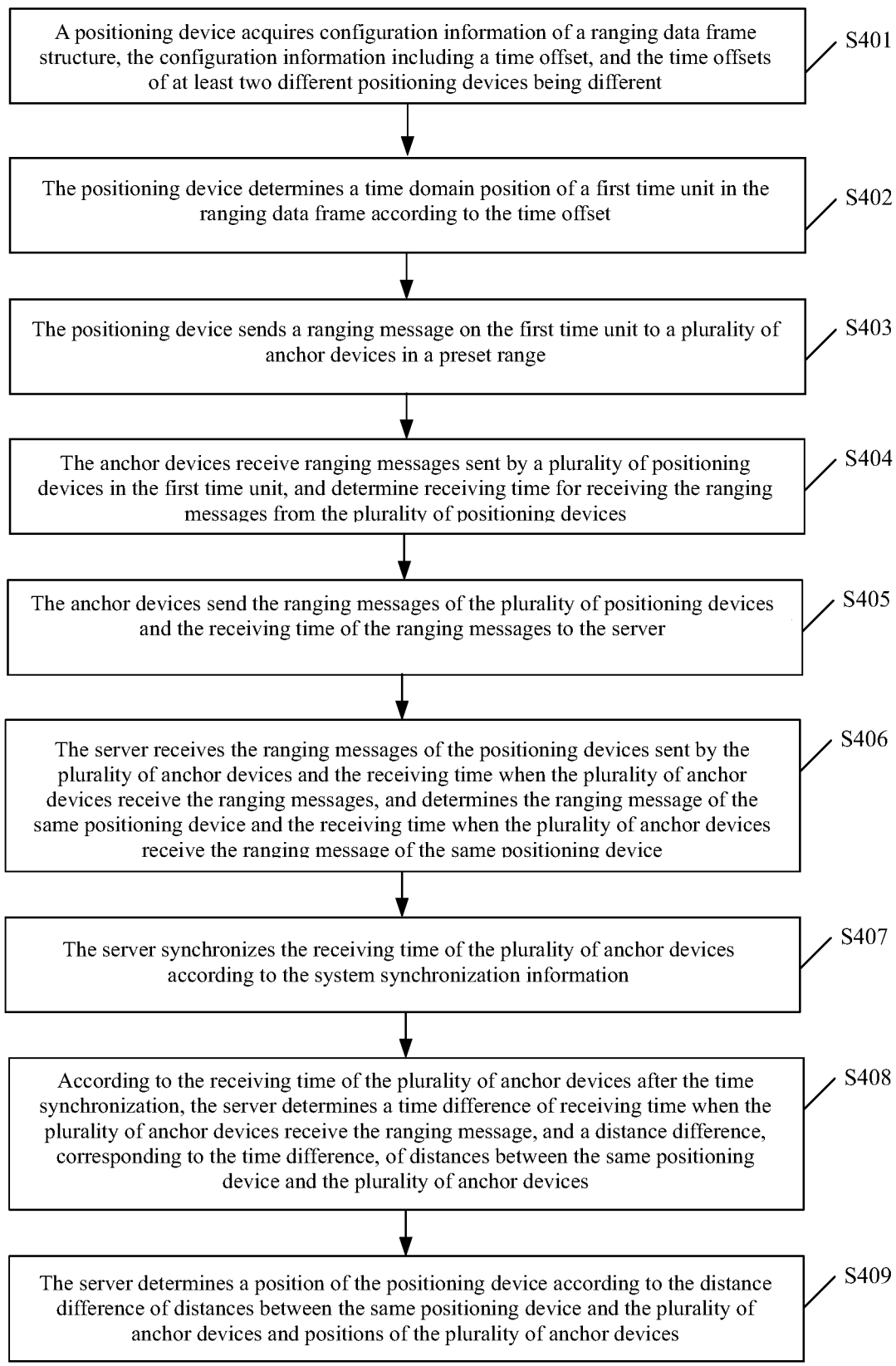
FIG. 4 is a fourth flowchart of a positioning method according to an example.

The disclosure further provides the following examples. FIG. 4 is a fourth flowchart of a positioning method according to an example. The method is applied to a positioning system. The positioning system includes positioning devices, anchor devices and a server. The method includes Step S401, in which a positioning device acquires configuration information from a ranging data frame structure. The configuration information includes a time offset. The time offsets of at least two different positioning devices differ from one another.

In this example, the positioning device may include a mobile device and a fixed device. The mobile device is a mobile terminal capable of sending UWB signals and the fixed device may be a fixed device equipped with a UWB tag. The positioning device acquires the configuration information from the ranging data frame structure. When the positioning device enters a positioning scenario, it needs to acquire the configuration information from the frame structure, so as to perform wireless communication transmission according to the configuration of the frame structure.

The positioning device determines the time offset corresponding to the positioning device according to the configuration information. The value of the time offset may be a value randomly generated by the server. In related technologies, the time domain position of a first time unit in the frame structure is fixed, and the ranging data sent by different positioning devices is prone to the problem of signal conflict. In order to reduce the problem of signal conflict, the actual sending time of the ranging data frame is changed using the time offset in this example, so that the actual sending time of the ranging data frames of at least two different positioning devices differ from one another. This reduces signal conflict.

Step S402, the positioning device determines a time domain position of a first time unit in the ranging data frame according to the time offset. In this example, the first time unit may be used to send a ranging message, and the positioning device may send the ranging message using a time-frequency resource on the first time unit. The time offset is an offset of the first time unit within the frame structure. After determining the time offset according to the configuration information of the frame structure, the positioning device determines the time domain position of the first time unit in the frame structure according to the time offset.

Figure 5:
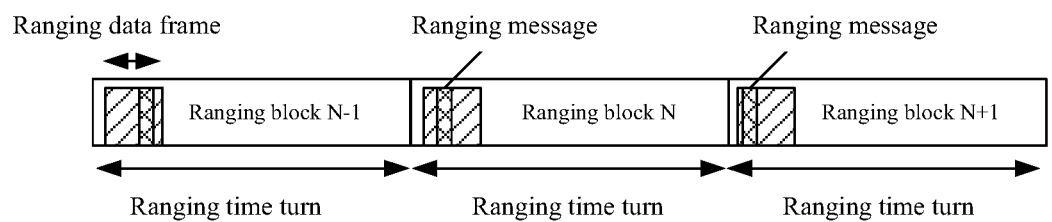
FIG. 5 is a first schematic diagram of a ranging data frame structure according to an example.
Figure 6:
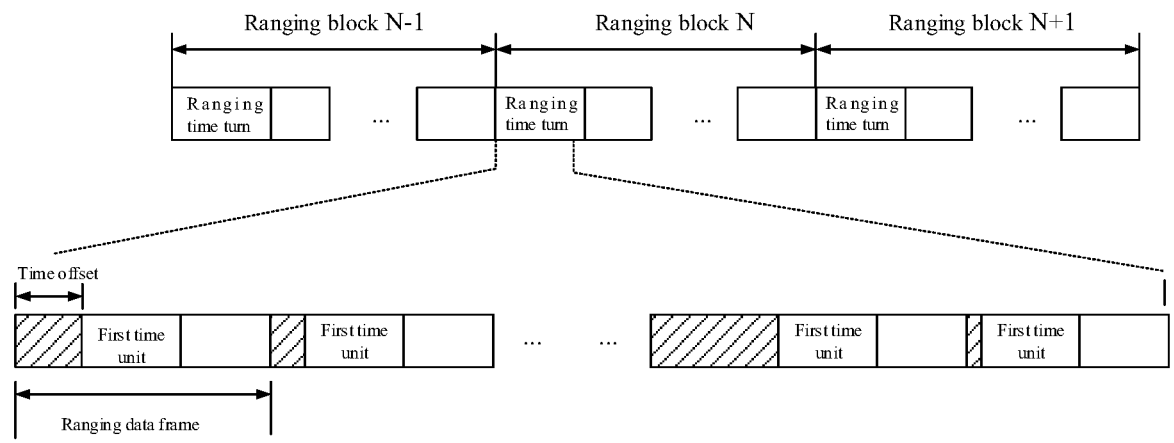
FIG. 6 is a second schematic diagram of a ranging data frame structure according to an example.

FIG. 5 is a first schematic diagram of a ranging data frame structure according to an example. FIG. 6 is a second schematic diagram of a ranging data frame structure according to an example. Because the time offset is a random number, the time offsets of different positioning devices may differ from one another. That is, the sending times of ranging messages sent by different positioning devices may differ from one another.

Step S403, the positioning device sends a ranging message on the first time unit to a plurality of anchor devices in a preset range. In this example, the positioning device broadcasts the ranging message on the first time unit, so that the plurality of anchor devices in the preset range receive the broadcast ranging message. It can be understood that the ranging message carries identification information of the positioning device, and the anchor device can determine the positioning device corresponding to the ranging message according to the identification information in the ranging message. In some examples, the first time unit occurs in the frame structure according to a predetermined cycle, and the predetermined cycle may be determined by the type of the positioning device.

In this example, the predetermined cycle can be set according to actual requirements, and the positioning device sends the ranging message at the predetermined cycle, so that the anchor device can determine the motion trajectory of the positioning device according to the ranging message periodically sent by the positioning device. Moreover, considering that different types of positioning devices may need to be tracked at different rates, different predetermined cycles can be set for different types of positioning devices. This ensures that network resources are effectively saved while the motion trajectory of the positioning device can be tracked.

In some examples, the type of the positioning device may include: a mobile device type and a fixed device type; and the predetermined cycle corresponding to the mobile device type is less than that corresponding to the fixed device type. In this example, the position of the positioning device of the mobile device type may change randomly, while the position of the positioning device of the fixed device type will not change. In order to more accurately analyze the motion trajectory of the positioning device, it is necessary to track the motion trajectory of the positioning device of the mobile device type at a faster rate, and track the motion trajectory of the positioning device of the fixed device type at a slower rate. The predetermined cycle of the positioning device of the mobile device type can be set to be less than that of the positioning device of the fixed device type. For example, the predetermined cycle of a mobile robot or high-end device can be set to 0.25 S, and the predetermined cycle of a static asset can be set to 3 S, so that the robot or high-end device can send a ranging message 4 times per second, while the static asset can send a ranging message once every 3 seconds.

In other examples, the method further includes the following. Switching the working mode to a first mode in the first time unit of the frame structure. Switching the working to a second mode beyond the first time unit of the frame structure, the power consumption of the second mode being lower than that of the first mode. In this example, the first mode may be a sending mode, and the second mode may be a sleep mode. The positioning device enters the sleep mode beyond the first time unit, which can reduce the power consumption of the positioning device to prolong the battery life of the positioning device.

In Step S404, the anchor devices receive ranging messages sent by a plurality of positioning devices in the first time unit, and determine receiving time for receiving the ranging messages from the plurality of positioning devices. In this example, the anchor device receives the ranging messages sent by the plurality of positioning devices in a preset range of the anchor device in the first time unit, and records and receives the receiving time of the ranging messages from the plurality of positioning devices.

Because the time offsets of at least two different positioning devices differ from one another, the time domain positions of the first time units in the frame structures of the at least two different positioning devices differ from one another. The times at which each of the anchor device receives ranging messages from the at least two different positioning devices may differ from one another. The anchor device continuously receives ranging messages sent from the positioning devices, and records timestamp information for time of receiving each of the ranging messages.

Step S405, the anchor devices send the ranging messages of the plurality of positioning devices and the receiving time of the ranging messages to the server. In this example, the anchor device sends the ranging messages received by the anchor device from the plurality of positioning devices and timestamp information of the ranging messages to the server. The timestamp information includes identification information of the positioning device. The server determines, according to the identification information in the timestamp information and the identification information of the anchor device, the anchor device that received the ranging message and the positioning device that sent the ranging message.

In this example, the anchor device sends the ranging messages of each of the plurality of positioning devices and the receiving time of the ranging messages to the server, so that the server can determine differences in the distance between the same positioning device and each of the plurality of anchor devices based on differences in times at which ranging messages from the same positioning device are received.

The distance differences can be used to describe the relative positional relationship between the positioning device and each of the plurality of anchor devices. Therefore, the position of each of the positioning devices can be determined according to the positions of the anchor devices and the differences in distance between the positioning device and each of the plurality of anchor devices. In this way, the positioning device need only periodically send ranging messages, and need not receive any message from the anchor device or the server. This reduces message interactions between the positioning device and the anchor device, reduces message delay and network resource consumption, so that the number of positioning devices that can be accommodated in the positioning system can be dynamically expanded.

In some examples, the anchor device may include: first anchor devices and a second anchor device. The first anchor devices send ranging messages received from each of the plurality of positioning devices and the receiving time of the ranging messages to the second anchor device. The second anchor device sends the plurality of ranging messages and the receiving time of the ranging messages to the server. The first anchor devices may be slave anchor devices, and the second anchor device may be a master anchor device. The master anchor device transmits data to the server.

In Step S406, the server receives from each of the plurality of anchor devices, the ranging messages sent by the positioning devices to each of the plurality of anchor devices along with the receiving time, i.e., the time at which each of the plurality of anchor devices received the ranging messages. The server determines which of the ranging messages correspond to the same positioning device, and the receiving time at which each of the plurality of anchor devices received the ranging message from the same positioning device.

In this example, the server receives the ranging messages of the positioning devices sent by the plurality of anchor devices and the receiving time of the ranging messages, and determines, according to the identification information of the positioning devices carried in the ranging messages, the ranging message of the same positioning device and the receiving time when the plurality of anchor devices receive the ranging message of the same positioning device, so as to determine the position of the positioning device according to the receiving time when the plurality of anchor devices receive the ranging message of the same positioning device.

Step S407, the server synchronizes the receiving time of the plurality of anchor devices according to the system synchronization information. In this example, considering that the clocks of the plurality of anchor devices may be asynchronous in the positioning system, the receiving times at which each of the plurality of anchor devices received the ranging message needs to be synchronized in order to accurately determine the position of the positioning device based on the receiving time at which each of the plurality of anchor devices received the ranging message from the same positioning device. After receiving the timestamp information of the ranging messages sent by the plurality of anchor devices, the server may unify the timestamp information of the plurality of anchor devices into a common time domain according to the system synchronization information, to reduce the impact of asynchronous clocks of the plurality of anchor devices on positioning.

In Step S408, according to the receiving time of the plurality of anchor devices after the time synchronization, the server determines a difference in the times at which each of the plurality of anchor devices received the ranging message. Differences in distances correspond to the differences in time with respect to the same positioning device and the corresponding plurality of anchor devices.

In this example, the server determines, according to the receiving time of the plurality of anchor devices after the time synchronization, the differences in times at which each of the plurality of anchor devices received the ranging message. The server determines, according to the time difference and the propagation rate of the ranging message, the difference in distances from the positioning device to each of the plurality of anchor devices.

In order to determine the position of the positioning device, a differences in times at which at least three different anchor devices receive the ranging message sent by the positioning device is determined. A difference in distances between the positioning device and each of the at least three anchor devices is estimated according to the time differences.

Step S409, the server determines a position of the positioning device according to the difference of distances between the same positioning device and each of the plurality of anchor devices and based on positions of the each of plurality of anchor devices. In this example, a hyperbola corresponding to every two anchor devices may be determined according to the difference in distances between a positioning device and one of every two anchor devices of the plurality of anchor devices, and based on the positions of each one of the every two anchor devices. The position of the positioning device is determined according to the plurality of hyperbolas obtained. It should be noted that the absolute value of the difference of distances between any point on the hyperbola and two focuses of the hyperbola is a fixed value.

In some examples, the method further includes the following. Sending by the server, system synchronization information to the plurality of anchor devices. Each anchor device performs system time synchronization on the clocks of the anchor devices according to the system synchronization information sent by the server.

In this example, in order to ensure the accuracy of positioning, synchronous clocks need to be ensured between the server and the plurality of anchor devices in the positioning system. The server sends the system synchronization information to the plurality of anchor devices, so that the plurality of anchor devices perform system time synchronization on the clocks corresponding to the plurality of anchor devices according to the system synchronization information sent by the server.

In other examples, the server sends the system synchronization information to the second anchor device. The second anchor device forwards the system synchronization information to each of the plurality of first anchor devices, so that each of the plurality of first anchor devices perform clock synchronization.

In this example, only the second anchor device (i.e., the main anchor device) in the positioning system can exchange information with the server. The second anchor device can obtain the system synchronization information from the server, and can forward the system synchronization information to each of the first anchor devices (i.e., the slave anchor devices) in the positioning system. This enables the clocks of each of the first anchor devices and the second anchor device to be synchronous with the system clock of the server.

Figure 7:
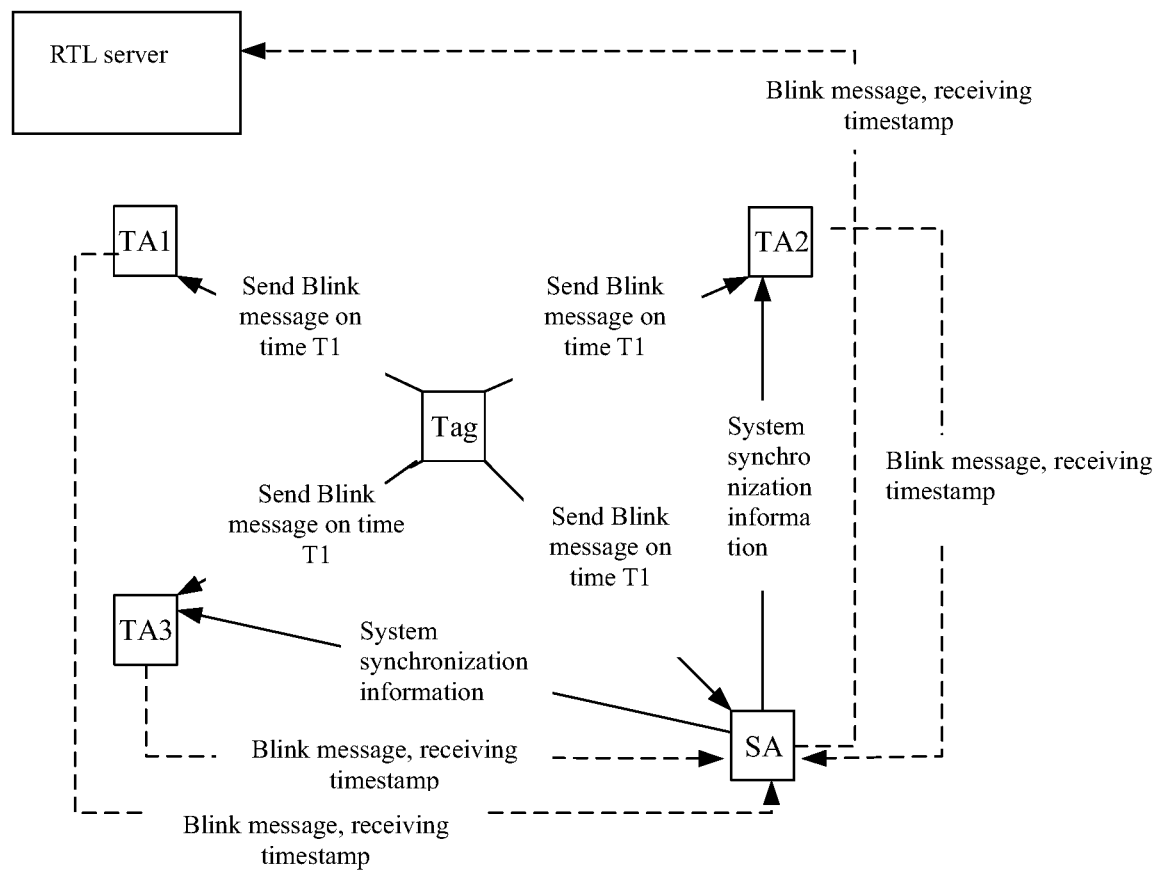
FIG. 7 is a block diagram of a positioning system according to an example.

FIG. 7 is a block diagram of a positioning system according to an example. The positioning device (Tag) may include a mobile device and a fixed device. The positioning device sends a Blink message at a random time in a one-way ranging behavior, so that anchor devices in a preset range receive the Blink message.

The anchor devices are set at fixed positions. By receiving Blink messages of the positioning device in the preset range and recording receiving timestamps of the received Blink messages, a master anchor device (SA) collects a plurality of Blink messages received by slave anchor devices (TA) and the receiving timestamps of the Blink messages, and reports the plurality of Blink messages and the receiving timestamps of the Blink messages to a server through an out-of-band network infrastructure device (such as Ethernet), so that the server can provide tracking coverage for the positioning device according to the receiving timestamps.

The server determines a difference in the times at which each of the plurality of anchor devices receives the Blink message from the same positioning device, based on the timestamps of the Blink messages sent by the anchor devices. The server estimates a position of the positioning device according to the time differences. The server is generally referred to as a real-time location server (RTLS) server, which may implement nanosecond (ns) time synchronization among the plurality of anchor devices.

Figure 8:
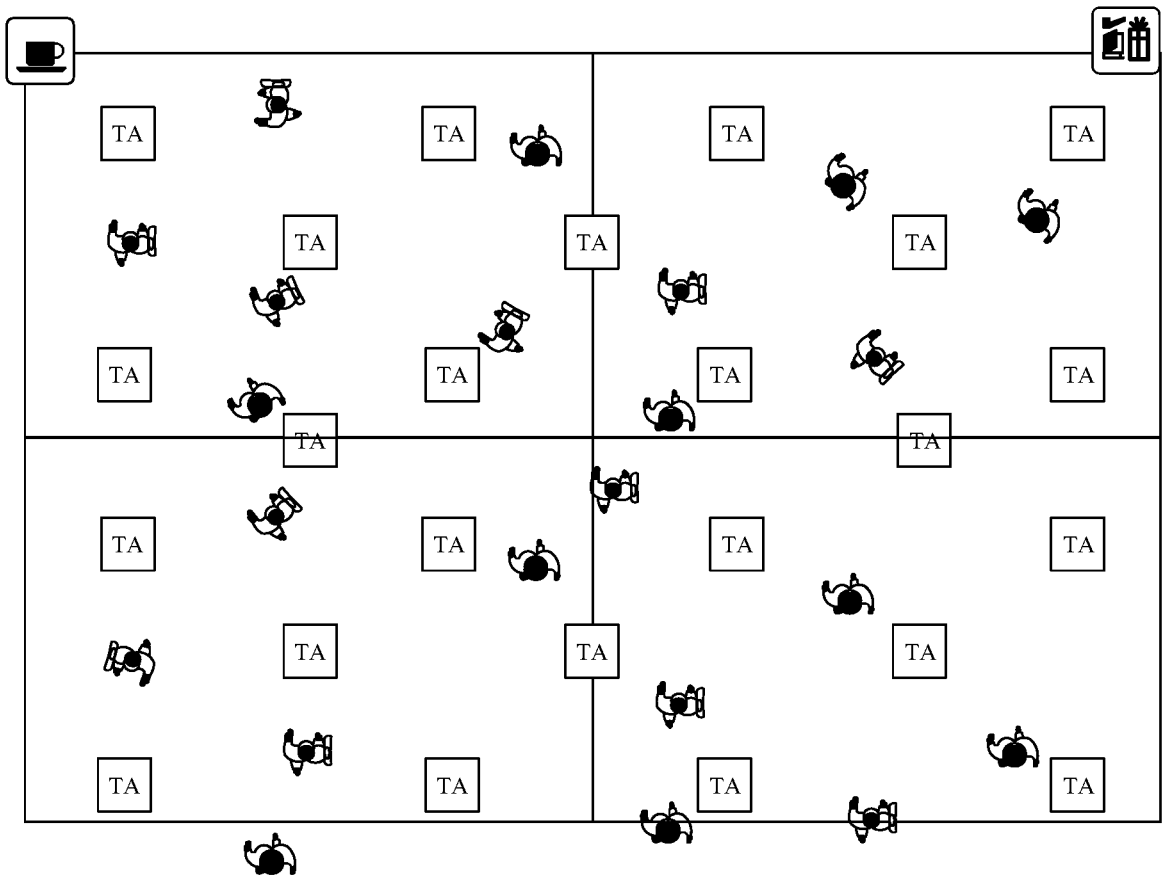
FIG. 8 is a block diagram of an application scenario of a positioning system according to an example.

The positioning system can be deployed in smart buildings, shopping malls or factories. FIG. 8 is a pictorial diagram of an application of a positioning system according to an example. In order to obtain accurate positions of persons or articles in this application scenario, the persons in the application scenario will carry a mobile terminal capable of sending UWB signals. Articles can be configured with a UWB tag. Anchor devices at fixed points in the positioning scenario receive the UWB ranging signals sent by the persons or articles to thereby track the persons or articles.

In examples of the disclosure, by configuring different time offsets for at least two different positioning devices, the time domain positions of the first time units in the ranging data frames of the at least two different positioning devices differ from one another. The time at which one of the at least two positioning devices differs from the time at which the other one of the at least two positioning devices sends its ranging message. Accordingly, the anchor devices receive ranging messages from different positioning devices on different first time units according to the different time offsets. This reduces the chance of mutual interference and collision between signals.

In addition, in a one-way positioning process, the positioning device need only send a ranging message to each of the plurality the anchor devices. The server can determine a time difference according to differences in times at which each of the plurality of anchor devices receives the corresponding ranging message. The server can perform the positioning of the positioning device on the basis of the time differences. Absolute transmission times of the ranging message between the positioning device and each of the plurality of anchor devices need not be determined. Each anchor device need only receive the ranging message on the first time unit corresponding to the positioning device. An anchor device need not send any response message to the positioning device. The number of messages sent between the anchor device and the positioning device can be effectively reduced in that manner. Communication resources are conserved and communication time is saved. At the same time, the number of positioning devices that can be accommodated by the positioning system is significantly increased using the same amount of communication resources.

Figure 9:
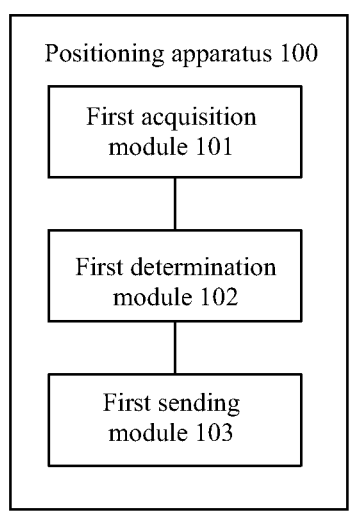
FIG. 9 is a block diagram of a positioning apparatus according to an example.

An example of the disclosure further provides a positioning apparatus. FIG. 9 is a block diagram of a positioning apparatus according to an example. As shown in FIG. 9, the positioning apparatus is incorporated in a positioning device. The positioning apparatus 100 includes a first acquisition module 101 configured to acquire configuration information from a ranging data frame structure. The configuration information includes a time offset. The time offsets of at least two different positioning devices differ from one another.

The positioning apparatus includes a first determination module 102 configured to determine a time domain position of a first time unit in the ranging data frame according to the time offset, and a first sending module 103 configured to send a ranging message on the first time unit to a plurality of anchor devices within a preset range of the positioning device. The ranging message is used by a server to determine a position of the positioning device according differences in times at which each of the plurality of anchor devices received the ranging message.

In some examples, the first time unit occurs in the frame structure according to a predetermined cycle, and the predetermined cycle is determined by the type of the positioning device. In some examples, the type of the positioning device includes: a mobile device type and a fixed device type. The predetermined cycle corresponding to the mobile device type is less than that corresponding to the fixed device type.

In some examples the apparatus further includes a switching module configured to switch the working mode from a current mode to a first mode in the first time unit of the frame structure, and to switch the working mode from the first mode to a second mode beyond the first time unit of the frame structure. This conserves power because the power consumption of the second mode is lower than that of the first mode.

Figure 10:
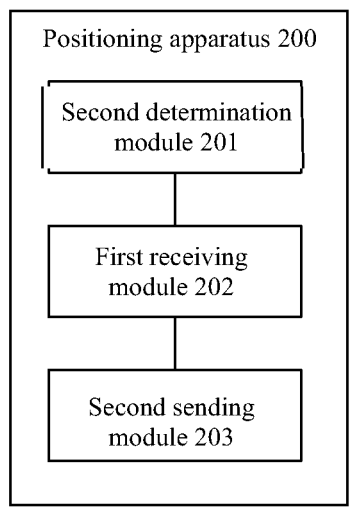
FIG. 10 is a block diagram of a positioning apparatus according to an example.

An example of the disclosure further provides a positioning apparatus. FIG. 10 is a block diagram of a positioning apparatus according to an example. As shown in FIG. 10, the positioning apparatus is implemented in an anchor device. The positioning apparatus 200 includes a second determination module 201 configured to determine a first time unit of each of a plurality of positioning devices. A time domain position of the first time unit in a ranging data frame of a positioning device is determined by a time offset of the positioning device. The time offsets of at least two different positioning devices are different from one another. A first receiving module 202 is configured to receive ranging messages sent by each of the plurality of positioning devices in the first time unit, and to determine a receiving time for receiving the ranging messages from each of the plurality of positioning devices.

A second sending module 203 is configured to send the ranging messages of the plurality of positioning devices and the receiving time of each of the ranging messages to a server. The receiving time of each of the ranging messages is used by the server to determine a time difference of the times at which the plurality of anchor devices receive ranging messages from the same positioning device and a distance difference. The distance difference corresponds to the time difference. The distance difference is the difference between the distance one of the positioning devices and the anchor device, and the distance between another one of the position devices and the anchor device. The distance difference is used to determine positions of positioning devices.

In some examples the apparatus further includes: a second acquisition module, configured to acquire system synchronization information sent by the server and to perform system time synchronization on clocks of the anchor devices. The synchronization on the clocks of the anchor devices is performed on the basis of the system synchronization information.

Figure 11:
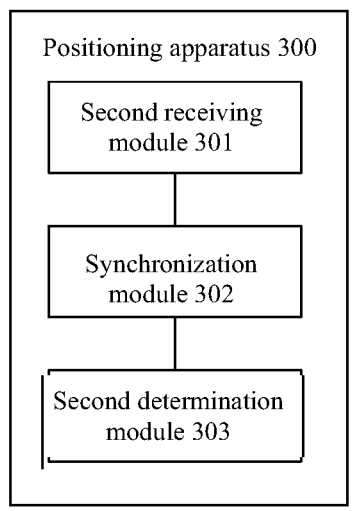
FIG. 11 is a block diagram of a positioning apparatus according to an example.

An example of the disclosure further provides a positioning apparatus. FIG. 11 is a block diagram of a positioning apparatus according to an example. As shown in FIG. 11, the positioning apparatus 300 is implemented in a server. The positioning apparatus 300 includes: a second receiving module 301, configured to receive a ranging message sent by a positioning to each of a plurality of anchor devices, and subsequently sent by each of the plurality of anchor devices, as well as a receiving time at which each of the plurality of anchor devices received the ranging message.

The apparatus 300 further includes a synchronization module 302 configured to perform time synchronization on the receiving times recorded by each of the plurality of anchor devices. The time synchronization is performed according to system synchronization information. The system further includes and a second determination module 303 configured to determine, according to the receiving time of the plurality of anchor devices after the time synchronization, a time difference of receiving time when the plurality of anchor devices receive the ranging message, and a distance difference, corresponding to the time difference, of distances between the same positioning device and the plurality of anchor devices; and determine a position of the positioning device according to the distance difference of distances between the same positioning device and the plurality of anchor devices and positions of the plurality of anchor devices.

Figure 12:
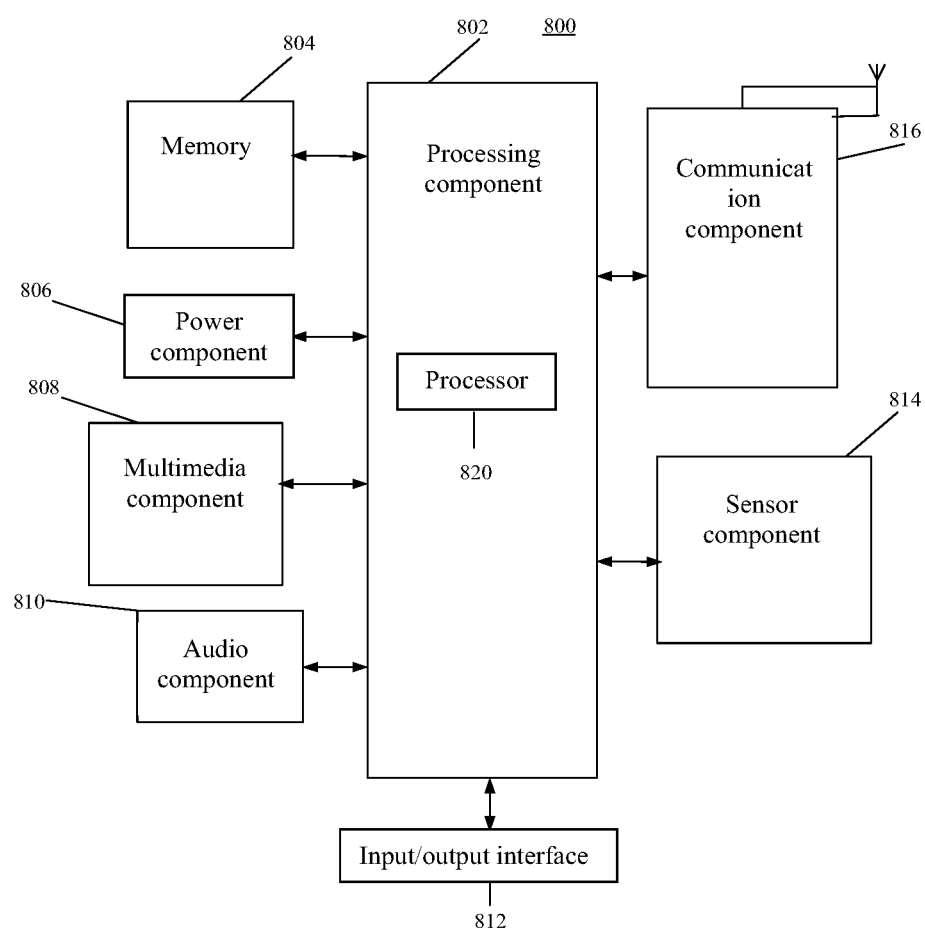
FIG. 12 is a block diagram of a positioning apparatus according to an example.

In some examples the synchronization module 302 is further configured to: send the system synchronization information to the plurality of anchor devices, the system synchronization information being used for the anchor devices to perform system time synchronization according to the system synchronization information. FIG. 12 is a block diagram of a positioning apparatus according to an example. For example, the apparatus 800 may be a mobile phone, a mobile computer, etc.

Referring to FIG. 12, the apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 usually controls overall operations of the apparatus 800, such as operations associated with display, telephone call, data communication, camera operation and recording operation. The processing component 802 may include one or more processors 820 to execute instructions to complete all of or part of the steps of the above method. In addition, the processing component 802 may include one or more modules to facilitate the interaction between the processing component 802 and other components. For example, the processing component 802 may include a multimedia module to facilitate interaction between the multimedia component 808 and the processing component 802.

The memory 804 is configured to store various types of data to support the operations at the apparatus 800. Examples of these data include instructions for any application or method operated on the apparatus 800, contact data, phone book data, messages, pictures, videos, etc. The memory 804 may be implemented by any type of volatile or non-volatile storage device or a combination, such as a static random access memory (SRAM), an electrically erasable programmable read-only memory (EEPROM), an erasable.

programmable read-only memory (EPROM), a programmable read-only memory (PROM), a read-only memory (ROM), a magnetic memory, a flash memory, a magnetic disk or an optical disk.

The power component 806 provides power for various components of the apparatus 800. The power component 806 may include a power management system, one or more power sources, and other components associated with power generation, management and distribution of the apparatus 800.

The multimedia component 808 includes a screen for providing an output interface between the apparatus 800 and the user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides and gestures on the touch panel. The touch sensor may sense not only the boundary of the touch or slide, but also the duration and pressure associated with the touch or slide. In some examples, the multimedia component 808 includes a front camera and/or a rear camera. When the apparatus 800 is in an operation mode, such as a shooting mode or a video mode, the front camera and/or the rear camera may receive external multimedia data. Each front or rear camera may be a fixed optical lens system or have a focal length and optical zoom capability.

The audio component 810 is configured to output and/or input audio signals. For example, the audio component 810 includes a microphone (MIC), and when the apparatus 800 is in an operation mode, such as a call mode, a recording mode and a voice recognition mode, the microphone is configured to receive external audio signals. The received audio signals may be further stored in the memory 804 or sent by the communication component 816. In some examples, the audio component 810 further includes a speaker for outputting audio signals.

The I/O interface 812 provides an interface between the processing component 802 and a peripheral interface module. The peripheral interface module may be a keyboard, a click wheel, buttons, etc. These buttons may include, but are not limited to a home button, a volume button, a start button and a lock button.

The sensor component 814 includes one or more sensors for providing various aspects of status assessment for the apparatus 800. For example, the sensor component 814 can detect an on/off state of the apparatus 800, and relative positions of components such as a display and a keypad of the apparatus 800. The sensor component 814 can also detect a position change of the apparatus 800 or one component of the apparatus 800, presence or absence of contact between the user and the apparatus 800, an orientation or acceleration/deceleration of the apparatus 800 and a temperature change of the apparatus 800. The sensor component 814 may include a proximity sensor configured to detect the presence of nearby objects without any physical contact. The sensor component 814 may also include an optical sensor, such as a CMOS or CCD image sensor, for use in imaging applications. In some examples, the sensor component 814 may also include an acceleration sensor, a gyroscope sensor, a magnetic sensor, a pressure sensor or a temperature sensor.

The communication component 816 is configured to facilitate wired or wireless communication between the apparatus 800 and other devices. The apparatus 800 may access a wireless network based on communication standards, such as WiFi, 2G or 3G, or a combination. In an example of the present disclosure, the communication component 816 receives broadcast signals or broadcast associated information from an external broadcast management system via a broadcast channel. In an example of the present disclosure, the communication component 816 further includes a near field communication (NFC) module to facilitate short-range communication. For example, the NFC module may be implemented based on radio frequency identification (RFID) technology, infrared data association (IrDA) technology, ultra wide band (UWB) technology, Bluetooth (BT) technology, and other technologies.

In an example, the apparatus 800 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components to perform the above method.

In an example, a non-transitory computer-readable storage medium including instructions is further provided, such as a memory 804 including instructions executable by the processor 820 of the apparatus 800 to complete the above method. For example, the non-temporary computer-readable storage medium may be an ROM, a random access memory (RAM), a CD-ROM, a magnetic tape, a floppy disk, an optical data storage device, etc.

A person skilled in the art would readily conceive of other examples of the disclosure after considering the specification and practicing the disclosure disclosed. The disclosure is intended to cover any variations, uses or adaptive changes of the disclosure. These variations, uses or adaptive changes follow the general principle of the disclosure and include common general knowledge or conventional technical means in the technical field that has not been disclosed in the disclosure. The description and the examples are merely regarded as exemplary, and the real scope and spirit of the disclosure are pointed out by the following claims.

It should be understood that the disclosure is not limited to the precise structure described above and shown in the drawings, and various modifications and changes can be made without departing from its scope. The scope of the disclosure is only limited by the appended claims.

What is claimed is:

1. A positioning method, implemented in a positioning device, the method comprising:
    acquiring configuration information from a ranging data frame structure, wherein the configuration information comprises a time offset, and the time offsets of at least two different positioning devices differ from one another;
    determining a time domain position of a first time unit in the ranging data frame according to the time offset; and
    sending a ranging message on the first time unit to a plurality of anchor devices within a preset range of the device, the ranging message being used by a server to determine a position of the positioning device according to differences in times at which each of the plurality of anchor devices received the ranging message,
    wherein
    the first time unit occurs in the frame structure according to a predetermined cycle, and the predetermined cycle is determined by the type of the positioning device,
    the type of the positioning device comprises: a mobile device type and a fixed device type, and
    the predetermined cycle corresponding to the mobile device type is less than that corresponding to the fixed device type.

2. The method according to claim 1, wherein the method further comprises:
- switching the working mode to a first mode in the first time unit of the frame structure; and
- switching the working mode to a second mode beyond the first time unit of the frame structure, wherein power consumption in the second mode is lower than that of the first mode.

3. A positioning apparatus, comprising:
- a processor; and
- a memory storing processor-executable instructions;
- wherein the processor is configured to: when executing the executable instructions stored in the memory, implement the positioning method according to claim 1.

4. A non-transitory computer-readable storage medium, when instructions in the storage medium are executed by a processor of a positioning apparatus, enabling the positioning apparatus to execute the positioning method according to claim 1.

\* \* \* \* \*